(12) United States Patent
Greiner et al.

(10) Patent No.: US 11,903,499 B2
(45) Date of Patent: Feb. 20, 2024

(54) SYSTEMS AND METHODS FOR DISPLAY CASE TURNDOWN

(71) Applicant: Hill Phoenix, Inc., Conyers, GA (US)

(72) Inventors: Pedro Greiner, Conyers, GA (US); Wendy Dinch, Conyers, GA (US); Nate Kaemingk, Tyrone, GA (US)

(73) Assignee: Hill Phoenix, Inc., Conyers, GA (US)

( * ) Notice: Subject to any disclaimer, the term of this patent is extended or adjusted under 35 U.S.C. 154(b) by 945 days.

(21) Appl. No.: 16/839,834

(22) Filed: Apr. 3, 2020

(65) Prior Publication Data

US 2021/0307540 A1 Oct. 7, 2021

(51) Int. Cl.
*A47F 3/04* (2006.01)
*G05B 15/02* (2006.01)

(52) U.S. Cl.
CPC .......... *A47F 3/0478* (2013.01); *A47F 3/0408* (2013.01); *A47F 3/0426* (2013.01); *A47F 3/0491* (2013.01); *G05B 15/02* (2013.01)

(58) Field of Classification Search
CPC ...... F25D 13/02; F25D 13/04; F25D 2400/14; F25D 2500/04; F25D 2500/06; F25D 2600/04; F25D 2600/06; F25D 2700/14; A47F 3/0478; A47F 3/0408; A47F 3/0426; A47F 3/0491
See application file for complete search history.

(56) References Cited

U.S. PATENT DOCUMENTS

| | | | | |
|---|---|---|---|---|
| 2011/0167853 A1* | 7/2011 | Kawaai | ................... | F25B 49/02 62/132 |
| 2015/0374143 A1* | 12/2015 | Takayama | ............. | A47F 3/0478 62/228.1 |
| 2021/0095898 A1* | 4/2021 | Tarbell | .................... | F25B 41/22 |

\* cited by examiner

*Primary Examiner* — Joseph F Trpisovsky
(74) *Attorney, Agent, or Firm* — Fish & Richardson P.C.

(57) ABSTRACT

A controller for a refrigerated display case includes processing circuitry configured to receive operational data from multiple refrigerated display cases and an ambient temperature reading from an ambient temperature sensor. The processing circuitry is configured to determine a limp level for a rack that includes the multiple refrigerated display cases based on the operational data and the ambient temperature reading. The processing circuitry is configured to determine an operational cooling parameter for each of the multiple refrigerated display cases based on the limp level. The operational cooling parameter indicates an amount of cooling or a corresponding cooling operation for each refrigerated display case. The processing circuitry is configured to operate each of the multiple refrigerated display cases using the operational cooling parameter.

20 Claims, 7 Drawing Sheets

| | 0 | 1 | 2 | 3 | 4 | 5 | 6 | 7 |
|---|---|---|---|---|---|---|---|---|
| Meat Case | 100% | 100% | 100% | 100% | 100% | 100% | 100% | 100% |
| Frozen Meat | 100% | 100% | 100% | 100% | 100% | 70% | 70% | 0% |
| Deli Case | 100% | 100% | 100% | 100% | 100% | 70% | 0% | 0% |
| Dairy | 100% | 100% | 100% | 100% | 100% | 70% | 0% | 0% |
| Frozen Food | 100% | 100% | 100% | 70% | 0% | 0% | 0% | 0% |
| Ice Cream | 100% | 100% | 100% | 70% | 0% | 0% | 0% | 0% |
| Cut Produce | 100% | 100% | 0% | 0% | 0% | 0% | 0% | 0% |
| Produce | 100% | 70% | 0% | 0% | 0% | 0% | 0% | 0% |
| Beverage | 100% | 0% | 0% | 0% | 0% | 0% | 0% | 0% |

FIG. 4

SYSTEMS AND METHODS FOR DISPLAY CASE TURNDOWN

BACKGROUND

The present disclosure relates to display cases. More particularly, the present disclosure relates to operation of racks of display cases with limited cooling capacity.

SUMMARY

One implementation of the present disclosure is a display case management system for multiple display cases. In some embodiments, the display case management system includes a rack configured to serve the multiple display cases, multiple local controllers, and a controller. In some embodiments, the controller includes processing circuitry configured to receive operational data from the multiple local controllers. In some embodiments, the processing circuitry is configured to receive an ambient temperature reading from an ambient temperature sensor. In some embodiments, the processing circuitry is configured to identify one or more of the multiple display cases that should be operated to provide reduced cooling, one or more of the multiple display cases that should be operated to maintain maximum cooling, and one or more of the multiple display cases that should be shut off using the operational data and the ambient temperature reading. In some embodiments, the processing circuitry is configured to operate the one or more of the multiple display cases to provide the reduced cooling, the one or more of the multiple display cases to maintain the maximum cooling, and shut off the one or more of the multiple display cases that should be shut off.

In some embodiments, the processing circuitry is configured to determine a limp level for the display case management system using the operational data and the ambient temperature reading. In some embodiments, the processing circuitry is configured to use the limp level and multiple priority levels to identify the one or more display cases that should be operated to provide reduced cooling, the one or more display cases that should be operated to maintain maximum cooling, and the one or more display cases that should be shut off.

In some embodiments, the multiple priority levels are programmable values that indicate a degree of criticality of each of the multiple display cases.

In some embodiments, the multiple priority levels are provided by a user to the controller through a user device.

In some embodiments, the processing circuitry is configured to estimate a cooling capability of the rack using the operational data and the ambient temperature. In some embodiments, the processing circuitry is configured to compare the estimated cooling capability of the rack to a rated cooling capability of the rack. In some embodiments, the processing circuitry is configured to determine the limp level based on the comparison between the cooling capability of the rack and the estimated cooling capability of the rack.

In some embodiments, the multiple priority levels include at least a fully activated level, a turned down level, or a deactivated level. In some embodiments, display cases with the fully activated level receive a rated amount of cooling. In some embodiments, display cases with the turned down level receive a reduced amount of cooling. In some embodiments, display cases with the deactivated level are shut off.

In some embodiments, the processing circuitry is configured to determine the limp level from multiple limp levels. In some embodiments, each of the multiple limp levels include a corresponding priority level for each of the multiple display cases.

Another implementation of the present disclosure is a method for managing multiple refrigerated display cases, according to some embodiments. In some embodiments, the method includes receiving operational data from multiple refrigerated display cases. In some embodiments, the method includes receiving an ambient temperature reading from an ambient temperature sensor. In some embodiments, the method includes determining a limp level based on the operational data received from the multiple refrigerated display cases and the ambient temperature reading. In some embodiments, the limp level includes an assigned priority level for each of the multiple refrigerated display cases. In some embodiments, the method includes identifying which of the multiple refrigerated display cases should be operated to provide reduced cooling, which of the multiple refrigerated display cases should be operated to maintain maximum cooling, and which of the multiple refrigerated display cases should be shut off using the limp level and the assigned priority level for each refrigerated display case. In some embodiments, the method includes operating the one or more of the multiple display cases to provide the reduced cooling, the one or more of the multiple refrigerated display cases to maintain the maximum cooling, and shut off the one or more of the multiple refrigerated display cases that should be shut off.

In some embodiments, the method includes automatically increasing or decreasing the limp level. In some embodiments, the method further includes operating each of the multiple refrigerated display cases according to the assigned priority level for the increased or decreased limp level. In some embodiments, the method further includes monitoring the operational data from the multiple refrigerated display cases. In some embodiments, the method further includes determining if a rack that serves the multiple refrigerated display cases can provide sufficient cooling for the multiple refrigerated display cases based on the operational data. In some embodiments, the method also includes automatically increasing or decreasing the limp level based on the determination of whether the rack can provide sufficient cooling for the multiple refrigerated display cases.

In some embodiments, the multiple priority levels are programmable values that indicate a degree of criticality of each of the multiple refrigerated display cases.

In some embodiments, the multiple priority levels are provided by a user through a user device.

In some embodiments, the method further includes estimating a cooling capability of the rack using the operational data and the ambient temperature. In some embodiments, the method further includes comparing the estimated cooling capability of the rack to a rated cooling capability of the rack. In some embodiments, the method further includes determining the limp level based on the comparison between the cooling capability of the rack and the estimated cooling capability of the rack.

In some embodiments, the assigned priority levels are any of a fully activated level, a turned down level, or a deactivated level. In some embodiments, refrigerated display cases with the fully activated level receive a rated amount of cooling. In some embodiments, refrigerated display cases with the turned down level receive a reduced amount of cooling. In some embodiments, refrigerated display cases with the deactivated level are shut off.

Another implementation of the present disclosure is a controller for a refrigerated display case. In some embodiments, the controller includes processing circuitry configured to receive operational data from multiple refrigerated display cases and an ambient temperature reading from an ambient temperature sensor. In some embodiments, the processing circuitry is further configured to determine a limp level for the multiple refrigerated display cases based on the operational data and the ambient temperature reading. In some embodiments, the processing circuitry is configured to determine an operational cooling parameter for each of the multiple refrigerated display cases based on the limp level. In some embodiments, the operational cooling parameter indicates an amount of cooling or a corresponding cooling operation for each refrigerated display case. In some embodiments, the processing circuitry is configured to operate each of the multiple refrigerated display cases using the operational cooling parameter.

In some embodiments, the operational cooling parameter is any of a cooling amount for each of the multiple refrigerated display cases or a temperature setpoint for each of the plurality of refrigerated display cases.

In some embodiments, the processing circuitry is configured to use the limp level and multiple priority levels associated with the limp level to determine the operational cooling parameter.

In some embodiments, the multiple priority levels are programmable values that indicate a degree of criticality of each of the multiple refrigerated display cases.

In some embodiments, the multiple priority levels are provided for each of multiple different limp levels by a user to the controller through a user device.

In some embodiments, the multiple priority levels include at least a fully activated level, a turned down level, or a deactivated level. In some embodiments, refrigerated display cases with the fully activated level are operated to provide a rated amount of cooling to an inner volume. In some embodiments, refrigerated display cases with the turned down level are operated to provide a reduced amount of cooling. In some embodiments, refrigerated display cases with the deactivated level are shut off.

In some embodiments, the processing circuitry is configured to determine the limp level from multiple limp levels. In some embodiments, each of the multiple limp levels include a corresponding priority level for each of the multiple refrigerated display cases.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4 is a table of different priorities and associated cooling loads for multiple display cases of a system, according to some embodiments.

DETAILED DESCRIPTION

Overview

Figure 1:
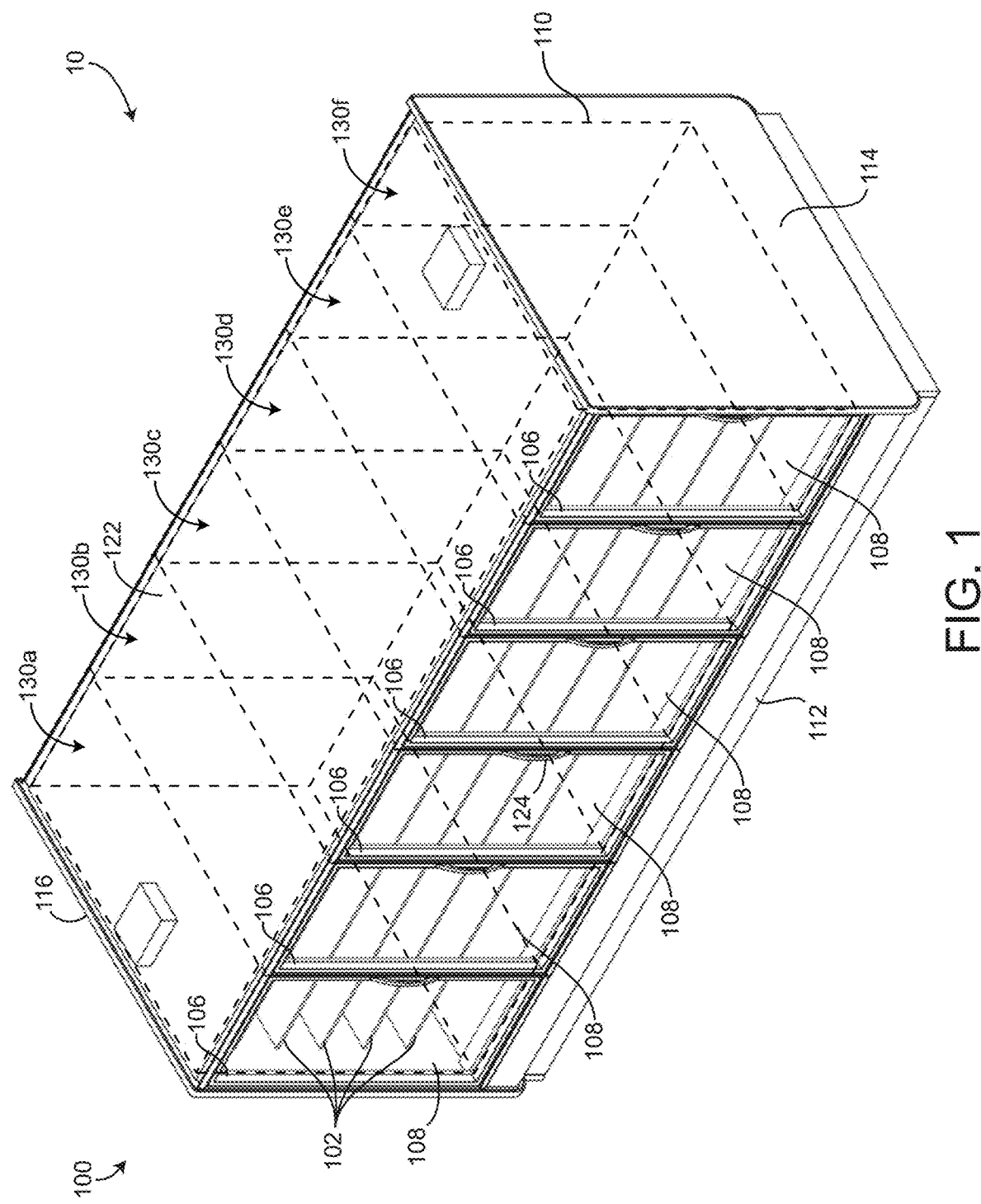
FIG. 1 is a perspective view of a temperature-controlled case, according to some embodiments.

Referring generally to the FIGURES, a system for turning down or reducing a cooling operation of one or more refrigerated display cases are shown. The system includes a controller that is configured to receive input data from one or more refrigerated display cases, one or more local controllers, and/or one or more racks of compressors. The local controllers each correspond to an associated one of the multiple refrigerated display cases, rack, or compressor. The local controllers may be configured to perform any of the functionality of the controller to determine turndown or reduced cooling operations.

The controller can also be configured to obtain an ambient temperature reading from an ambient temperature sensor of the system. The ambient temperature reading may indicate a current ambient temperature in an area, location, zone, spatial location, etc., where the one or more refrigerated display cases, local controllers, racks, etc., are positioned.

The controller can receive one or more priority levels from a user device. The priority levels may be programmable values that are provided by a store owner, a technician, an operator, etc., and may indicate a priority for each of the one or more refrigerated display cases, racks of compressors, etc. The rack may include multiple compressors that are configured to compress and discharge a coolant through various tubular members, conduits, etc., of the system. The compressors may pressurize the refrigerant and discharge the refrigerant into a common discharge header that is then routed to a condenser which condenses the refrigerant. The condenser can provide the condensed refrigerant to various refrigerated display cases (e.g., to refrigeration apparatuses of the display case) for performing cooling operations. When the rack has reduced capacity for a variety of reasons (e.g., inoperational or faulty components, high ambient temperature, etc.), certain refrigerated display cases may include products that are more critical to keep cold than others. The priority levels may indicate which refrigerated display cases contain products that are more critical to keep cold. The controller can selectively turn off, turndown, or otherwise reduce cooling for refrigeration cases which are lower priority in order to protect the ability for cases with critical temperature products to continue operating at full capacity or to provide sufficient cooling.

The controller also receives diagnostic data from the local controllers and can identify a cooling capacity or a cooling capability of each refrigerated display case or each rack based on the diagnostics data. For example, the diagnostics data may indicate which components, devices, subsystems, etc., have failed or are inoperational. The controller can use the diagnostics data in combination with the ambient temperature reading to identify, determine, calculate, etc., a cooling capacity or a cooling capability of each refrigerated display case or an operational ability of the rack.

The controller can determine a level or a limp level of each refrigerated display case or each rack based on a cooling or operational capability or capacity of the rack and a rated or expected cooling or operational capability of the rack. The level or the limp level may indicate an operational ability of the rack to function to provide cooling for the refrigerated display cases. The controller can use any number of levels (e.g., 7, 15, 100, etc.). Higher levels may indicate lower operational ability of the rack to facilitate or perform cooling operations, while lower levels may indicate higher operational ability of the rack to perform cooling operations. As used herein the term "limp level" may refer to an operational ability of the rack or various cooling apparatuses for one or more refrigerated display cases. The limp level may indicate operational ability of the rack or the refrigerated display cases for cooling operations relative to a normally or properly functioning rack or a properly functioning refrigerated display case. In some embodiments, the limp level is assigned by the controller based on an operational ability of the rack or the refrigerated display cases to achieve desired cooling. The limp level may be a system-wide parameter that is assigned or determined for an entire system (e.g., including a rack of compressors that discharge coolant into a header that is routed to a condenser of various refrigerated display cases in the system). In this way, if the system-wide ability for performing cooling operations decreases, the system may be assigned a higher limp level.

The controller can use the limp levels and the priority for each refrigerated display case to determine an amount of cooling for each refrigerated display case. The controller can determine that certain refrigerated display cases should operate to provide full cooling, reduced cooling, or no cooling (e.g., should be shut off). The controller may use the determined amount of cooling for each refrigerated display case to determine control signal or temperature setpoints for the refrigerated display cases and may operate the refrigerated display cases according to the control signals or the temperature setpoints to provide the determined amount of cooling.

For example, the controller can transition one or more of the refrigerated display cases into an "eco" or reduced cooling mode. In some embodiments, the controller reduces cooling at one or more of the refrigerated display cases by increasing an amount of time between defrost operations (e.g., by defaulting to a maximum amount of time between defrost operations), sequencing defrost operations for load balancing, changing temperature setpoints for the refrigerated display cases, and/or adjusting superheat targets and PID values to reduce energy usage and reduce cooling operations.

Advantageously, the systems and methods described herein provide a smart system that intelligently reduces cooling operations for display cases based on a criticality of each display case. Other cooling systems do not utilize a "smart shutdown" or "smart turndown" of display cases. Such systems may attempt to operate all cases to provide rated cooling which may result in the cases being unable to meet target temperatures. Cases which are closest to the rack may be the most likely to keep their temperature rather than cases that are farthest from the rack (in pipe distance) due to physics.

Temperature Controlled Display Case

Figure 2:
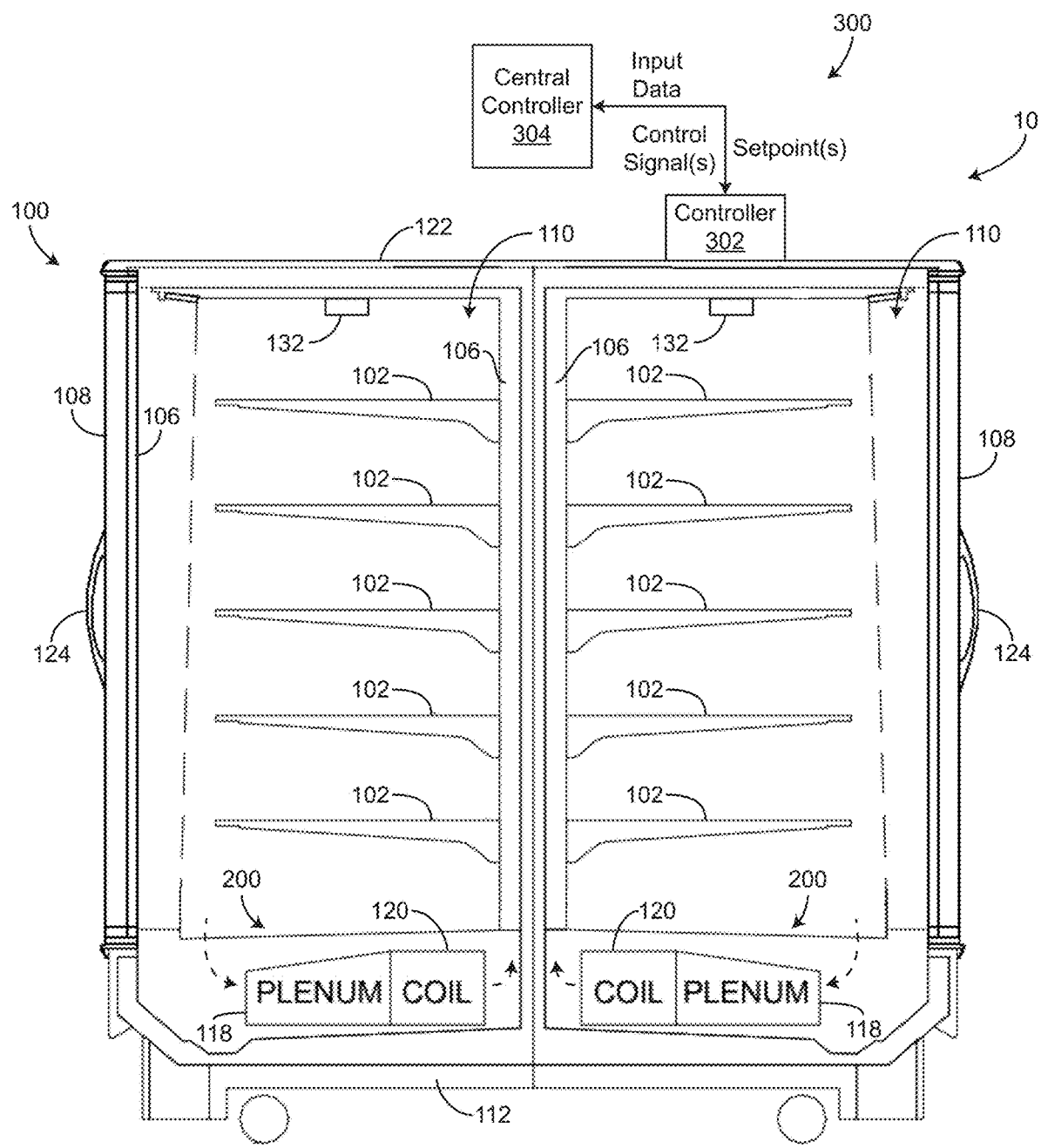
FIG. 2 is side view of the temperature-controlled case, according to some embodiments.

Referring to FIGS. 1-2, a display case system 10 includes a refrigerated display case, a display case, a temperature controlled case, etc., shown as display case 100 is shown, according to some embodiments. Display case system 10 can also include a controller 302. In some embodiments, controller 302 is a component of display case 100. Display case 100 includes a base, a frame, a carriage, a main structure, a floor, etc., shown as base 112. Display case 100 also includes multiple sidewalls, walls, planar structures, planar members, support members, etc., shown as sidewall 116 and sidewall 114. Sidewall 114 and sidewall 116 may be positioned a distance apart from each other along a longitudinal axis of display case 100.

Display case 100 also includes a top wall, a top surface, a ceiling, etc., shown as upper wall 122. Upper wall 122 may be fixedly coupled with sidewall 114 and sidewall 116. Upper wall 122, sidewall 114 and sidewall 116 may be sealingly coupled with each other to facilitate preventing the escape of air from within display case 100.

Display case 100 also includes multiple doors, windows, access points, openings, etc., shown as doors 108. Display case 100 can include a first set of doors 108 along a first side of display case 100 and a second set of doors 108 along a second or opposite side of display case 100. Doors 108 can be hingedly coupled between upper wall 122 and base 112, or may be slidable (e.g., configured to translate along a track to facilitate access to an interior of display case 100). Doors 108 may facilitate access of an interior volume or conditioned space within display case 100 (e.g., inner volume 110 as described herein). In other embodiments, display case 100 only includes a first set of doors 108 along one side of display case 100, and an opposite side of display case 100 is a wall member (e.g., similar to sidewall 114 and/or sidewall 116).

Sidewall 114, sidewall 116, base 112, and upper wall 122 cooperatively define an inner volume 110. Inner volume 110 can be an interior volume of display case 100 that is temperature controlled (e.g., cooled) by a cooling apparatus or a cooling system, shown as refrigeration apparatus 200 of display case 100. Refrigeration apparatus 200 includes a plenum 118 and a coil 120 that are configured to operate to draw air from inner volume 110, cool the air, and discharge or output cooled air to inner volume 110. Coil 120 may be or include a heat exchanger that is configured to circulate a coolant and pass air over the heat exchanger to decrease a temperature of the air (e.g., to cool the air). The cool air is then discharged to inner volume 110 to maintain a desired temperature within inner volume 110.

Referring still to FIGS. 1-2, display case 100 can include a controller 302 and a temperature sensor 132. Controller 302 is configured to generate control signals for refrigeration apparatus 200 so that refrigeration apparatus 200 operates to achieve a desired amount of cooling or a desired temperature within display case 100. Controller 302 can receive values of a current temperature within display case 100 from temperature sensor 132. In this way, controller 302 may operate refrigeration apparatus 200 using a closed-loop control scheme, with sensor data obtained from temperature sensor 132 functioning as feedback.

Referring particularly to FIG. 2, display case 100 can include multiple shelves 102. Shelves 102 may extend from a rear wall, or a central member 106 of display case 100. Shelves 102 can be configured to support a product (e.g., containers, dairy products, food items, etc.) so that when a customer accesses inner volume 110 of display case 100, the customer may also access the product on shelves 102. In some embodiments, shelves 102 are spaced apart along a vertical direction. Shelves 102 may also fixedly couple or be supported by sidewall 114 and/or sidewall 116.

Referring again to FIG. 1, display case 100 can be modular, including multiple sections or multiple refrigerated display cases 100 that are positioned along base 112. Inner volume 110 can include multiple sub-volumes 130a-130f (e.g., six) that each include shelves 102 configured to store product. Sub-volumes 130a-130f can each include a corresponding door 108 and/or a corresponding refrigeration apparatus 200. In this way, a temperature or cooling of each sub-volume 130a-130f can be independently controlled by controller 302 through operation of refrigeration apparatuses 200.

Display Case Management System

Referring particularly to FIG. 2, controller 302 can be communicably coupled with a central controller 304 of a control system, shown as display case management system 300. Controller 302 may be configured to provide central controller 304 of display case management system 300 with diagnostics data, alarm data, operational data, etc., regarding display case 100, and/or any sensors, systems, sub-systems, devices, apparatuses (e.g., refrigeration apparatus 200), etc., shown as input data. For example, the input data may include an indication regarding any inoperational fans, compressors, evaporators, condensers, etc., of display case 100. Central controller 304 can be configured to use any of the input data to determine control signal(s) and/or setpoint(s) for display case 100, or for multiple display cases 100 in a store, building, zone, area, unit, etc. In some embodiments, central controller 304 uses the input data obtained across multiple display cases 100 to determine a cooling or operational capacity/ability of one or more racks or display cases 100, and to determine which of display cases 100 should be turned down (in regards to their cooling operations), which of display cases 100 should maintain maximum or normal cooling, and which of display cases 100 should be de-activated so that they do not provide cooling. It should be understood that while central controller 304 is described as performing the functionality of determining which display cases 100 to turndown, any of controller 302, or a rack controller that is configured to operate a rack of compressors can be configured to perform the functionality of central controller 304 as described herein.

Figure 3:
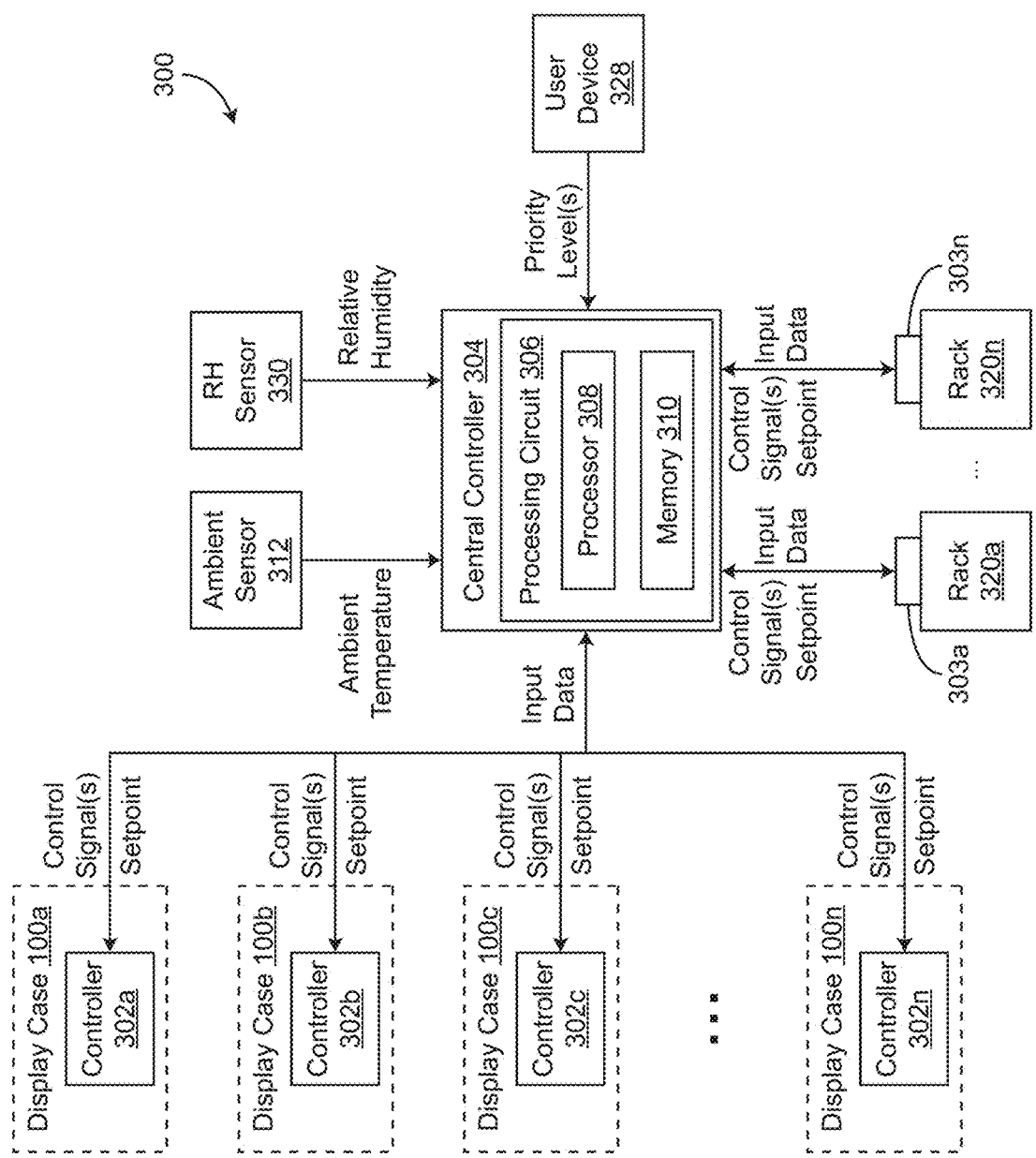
FIG. 3 is a block diagram of a system for turning down operation of one or more display cases, according to some embodiments.

Referring particularly to FIG. 3, display case management system 300 is shown in greater detail, according to some embodiments. Display case management system 300 includes central controller 304 that is configured to obtain input data from one or more racks 320a-320n or one or more display cases 100a-100n. In some embodiments, each rack 320 includes a single corresponding controller 303 that is configured to operate rack 320 and obtain operational data, input data, diagnostic data, sensor data, etc., from rack 320. The single controller 303 of each rack 320 may be configured to perform the functionality of central controller 304 as described herein, or may be configured to provide the input data to central controller 304 so that central controller 304 can perform the functionality as described herein to determine turndown of one or more display cases 100.

Referring still to FIG. 3, each display case 100 is shown to include a corresponding controller 302a. The corresponding controller 302 is configured to obtain the input data for the associated display case 100 and provide the input data to central controller 304. In some embodiments, each controller 302 is configured to operate the corresponding display case 100. For example, controller 302a may be configured to obtain input data regarding display case 100a and provide the input data to central controller 304. Controller 302a is also configured to receive control signal(s) or setpoint(s) from central controller 304 and use the control signal(s) or setpoint(s) to operate display case 100a according to the control signal(s) or setpoint(s) provided by central controller 304. In some embodiments, controller 302a is configured to perform the functionality of central controller 304 as described herein to determine control signal(s) or setpoint(s) for display case 100a (or refrigeration apparatus 200) locally.

Referring still to FIG. 3, display case management system 300 includes a temperature sensor, shown as ambient sensor 312 and/or a relative humidity sensor 330. Ambient sensor 312 may be configured to measure, detect, obtain, etc., an ambient temperature $T_{amb}$ of an area, zone, building, store, etc., where display cases 100 or racks 320 are located. Likewise, relative humidity sensor 330 may be configured to measure, detect, obtain, etc., a relative humidity RH of the area, zone, building, store, etc., where display cases 100 or racks 320 are located. In some embodiments, display case management system 300 includes multiple ambient sensors 312 that are each configured to measure or obtain ambient temperature readings at different spatial locations (e.g., different spatial locations in the area, zone, building, store, etc., or at different areas, zones, buildings, stores, etc.) and/or multiple relative humidity sensors 330 that are each configured to measure or obtain relative humidity readings at any of the different spatial locations.

Referring still to FIG. 3, display case management system 300 includes a user device 328 (e.g., a display device, a touchscreen, a user input device, a mobile device, a human machine interface, a user interface, etc.). Central controller 304 is configured to receive one or more priority level(s) from user device 328. The priority level(s) can also be provided by a user, a store owner, a technician, an operator, a manager, etc., through a user device 328 at each of the display cases 100 or at each rack 320.

Referring still to FIG. 3, central controller 304 includes a processing circuit 306, a processor 308, and memory 310. Processing circuit 306 can be communicably connected to a communications interface such that processing circuit 306 and the various components thereof can send and receive data via the communications interface. Processor 308 can be implemented as a general purpose processor, an application specific integrated circuit (ASIC), one or more field programmable gate arrays (FPGAs), a group of processing components, or other suitable electronic processing components.

Memory 310 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 310 can be or include volatile memory or non-volatile memory. Memory 310 can include database components, object code components, script components, or any other type of information structure for supporting the various activities and information structures described in the present application. According to some embodiments, memory 310 is communicably connected to processor 308 via processing circuit 306 and includes computer code for executing (e.g., by processing circuit 306 and/or processor 308) one or more processes described herein.

Figure 5:
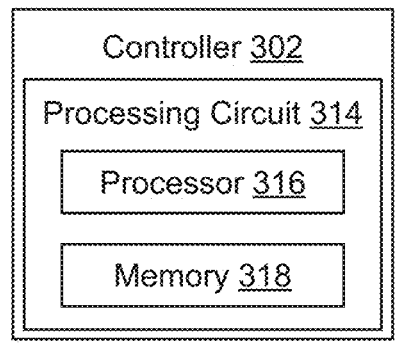
FIG. 5 is a block diagram of a controller of a display case, according to some embodiments.

Referring particularly to FIG. 5, controller 302 includes a processing circuit 314, a processor 316, and memory 318. Processing circuit 314 can be communicably connected to a communications interface such that processing circuit 314 and the various components thereof can send and receive data via the communications interface. Processor 316 can be implemented as a general purpose processor, an application specific integrated circuit (ASIC), one or more field programmable gate arrays (FPGAs), a group of processing components, or other suitable electronic processing components.

Memory 318 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 318 can be or include volatile memory or non-volatile memory. Memory 318 can include database components, object code components, script components, or any other type of information structure for supporting the various activities and information structures described in the present application. According to some embodiments, memory 318 is communicably connected to processor 316 via processing circuit 314 and includes computer code for executing (e.g., by processing circuit 314 and/or processor 316) one or more processes described herein.

Figure 6:
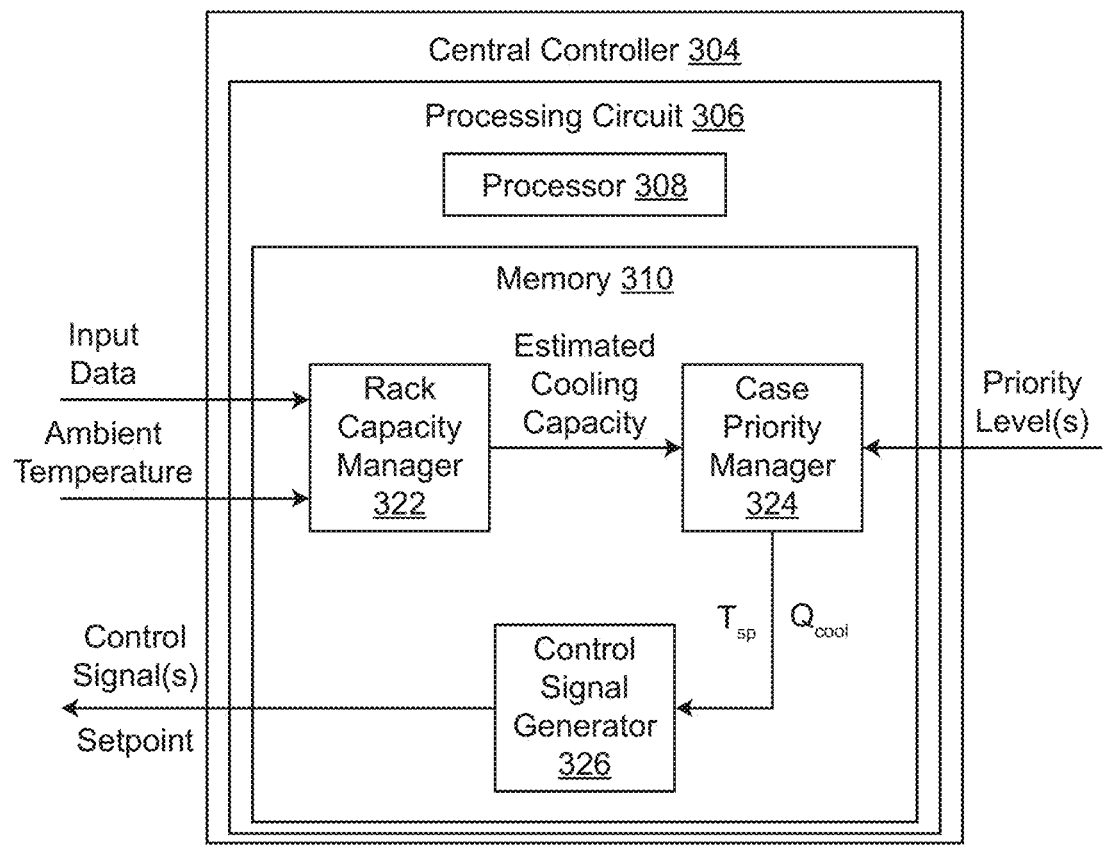
FIG. 6 is a block diagram of a controller configured to operate one or more display cases to perform a turndown operation, according to some embodiments.

Referring particularly to FIG. 6, central controller 304 is shown in greater detail, according to some embodiments. Memory 310 is shown to include a rack capacity manager 322, a case priority manager 324, and a control signal generator 326. Rack capacity manager 322 is configured to use the input data, the relative humidity readings, and/or the ambient temperature readings to determine an estimated cooling capacity of one or more of racks 320. Case priority manager 324 may be configured to determine an amount of cooling for each display case 100 (e.g., a reduced amount of cooling) based on the estimated cooling capacity as determined by rack capacity manager 322 and one or more priority level(s) for each display case 100. Control signal generator 326 can be configured to receive the amount of cooling for each display case 100 and generate control signal(s) or setpoint(s) for each display case 100.

Rack capacity manager 322 is configured to use the input data, the relative humidity readings/data, and/or the ambient temperature data from controllers 302 (e.g., display cases 100) or controllers 303 and ambient sensor 212 to determine, estimate, calculate, etc., a cooling capacity or operational ability of each rack 320. In some embodiments, rack capacity manager 322 uses a predetermined set of instructions, one or more predefined relationships, a look-up table, one or more models, etc., to estimate the cooling capacity of each rack 320. Rack capacity manager 322 can also use various properties of each display case 100 or rack 320 (e.g., a number of display cases 100, models of display cases 100 and/or racks 320, a type or rated capacity of refrigeration apparatus 200, etc.) to estimate the cooling capacity. For example, rack capacity manager 322 may select a different model, a different technique, a different function, relationship, etc., based on a model of rack 320, ratings of rack 320, a model of display case 100, various ratings of display case 100, etc. In some embodiments, rack capacity manager 322 is configured to use various alarms, diagnostic data, etc., of the input data to determine the estimated cooling capacity. For example, the input data may indicate that one or more compressors, evaporators, condensers, fans, etc., have failed or are not operating properly. Rack capacity manager 322 can use the indications of which compressors, evaporators, fans, etc., of rack 320 are not operating properly to estimate the cooling capacity of rack 320 or display case 100.

In some embodiments, rack capacity manager 322 also uses the ambient temperature and/or the relative humidity to determine the cooling capacity of rack 320 or display case 100. For example, as the ambient temperature increases, display case 100 or rack 320 may have a lower cooling capacity or operational ability. Since racks 320 or display cases 100 operate by recirculating air, cooling the air by removing heat from the air (e.g., with a coolant or refrigerant), and providing the cooled air to inner volume 110, increased ambient temperatures may decrease the cooling capacity of rack 320 or display case 100 since refrigeration apparatus 200 may only be able to remove a particular amount of energy or a particular amount of heat from the air. Conversely, as the ambient temperature decreases, the cooling capacity or capability of display case 100 and/or rack 320 may increase.

In some embodiments, rack capacity manager 322 is configured to estimate the cooling capacity using the Equation:

$$Q_{capacity}=Q_{rated}-Q_{operational}-Q_{ambient}$$

where $Q_{capacity}$ is the estimated cooling capacity or operational ability of rack 320 or display case 100 (e.g., in BTUs, Joules, etc.), $Q_{rated}$ is a rated or maximum cooling capacity of rack 320 or display case 100 (e.g., as determined by rack capacity manager 322 based on a type, size, model, etc., of display case 100, rack 320, refrigeration apparatus 200, etc.), $Q_{operational}$ is an estimated amount of cooling capacity loss expected to occur based on an operational status or failure status of various components of rack 320 and/or display case 100 (e.g., whether or not a compressor is operating properly, whether or not an evaporator is operating properly, etc.), and $Q_{ambient}$ is an estimated amount of cooling capacity loss expected to occur as a result of ambient or environmental temperature conditions and/or relative humidity. The estimated cooling capacity $Q_{capacity}$ can be obtained from a database including a maximum or rated cooling capacity of display case 100 and/or rack 320 based on a size, model, type, etc., of display case 100, rack 320, or refrigeration apparatus 200.

In some embodiments, rack capacity manager 322 is configured to estimate the cooling capacity loss that results from the ambient temperature using the Equation:

$$Q_{ambient}=f(T_{ambient})$$

where $Q_{ambient}$ is the estimated cooling capacity loss that results from the ambient temperature, $T_{ambient}$ is the ambient temperature (e.g., as measured by ambient sensor 312), and f is a model (e.g., a linear function, a non-linear function, a relationship developed based on empirical data and a regression, an nth order polynomial, an exponential function, a logarithmic function, etc.) that relates $T_{ambient}$ to $Q_{ambient}$. Similarly, rack capacity manager 322 may be configured to estimate the cooling capacity loss that results from the relative humidity:

$$Q_{ambient}=f(RH)$$

or a combination of both the environmental temperature conditions and the relative humidity:

$$Q_{ambient}=f(T_{ambient},RH)$$

Rack capacity manager 322 provides the estimated cooling capacity $Q_{capacity}$ to case priority manager 324 so that case priority manager 324 can use the estimated cooling capacity $Q_{capacity}$ to determine an amount of cooling $Q_{case}$ for each display case 100. In some embodiments, case priority manager 324 also uses a priority level for each display case 100 to determine the amount of cooling $Q_{case}$ for each display case 100. In some embodiments, the amount of cooling $Q_{case}$ is less than a corresponding rated or maximum cooling amount $Q_{case,rated}$ for the display case 100.

Case priority manager 324 can be configured to determine a limp mode level based on a difference between the estimated cooling capacity $Q_{capacity}$ of rack 320 or display case 100 and the rated or maximum cooling capacity $Q_{rated}$ of rack 320 or display case 100. In some embodiments, case priority manager 324 is configured to compare the estimated cooling capacity $Q_{capacity}$ to multiple ranges or thresholds to determine a limp level of rack 320 or display case 100. It should be understood that case priority manager 324 can compare the estimated cooling capacity $Q_{capacity}$ to any number of thresholds or ranges, each threshold or range corresponding to a limp level of rack 320.

Figure 8:
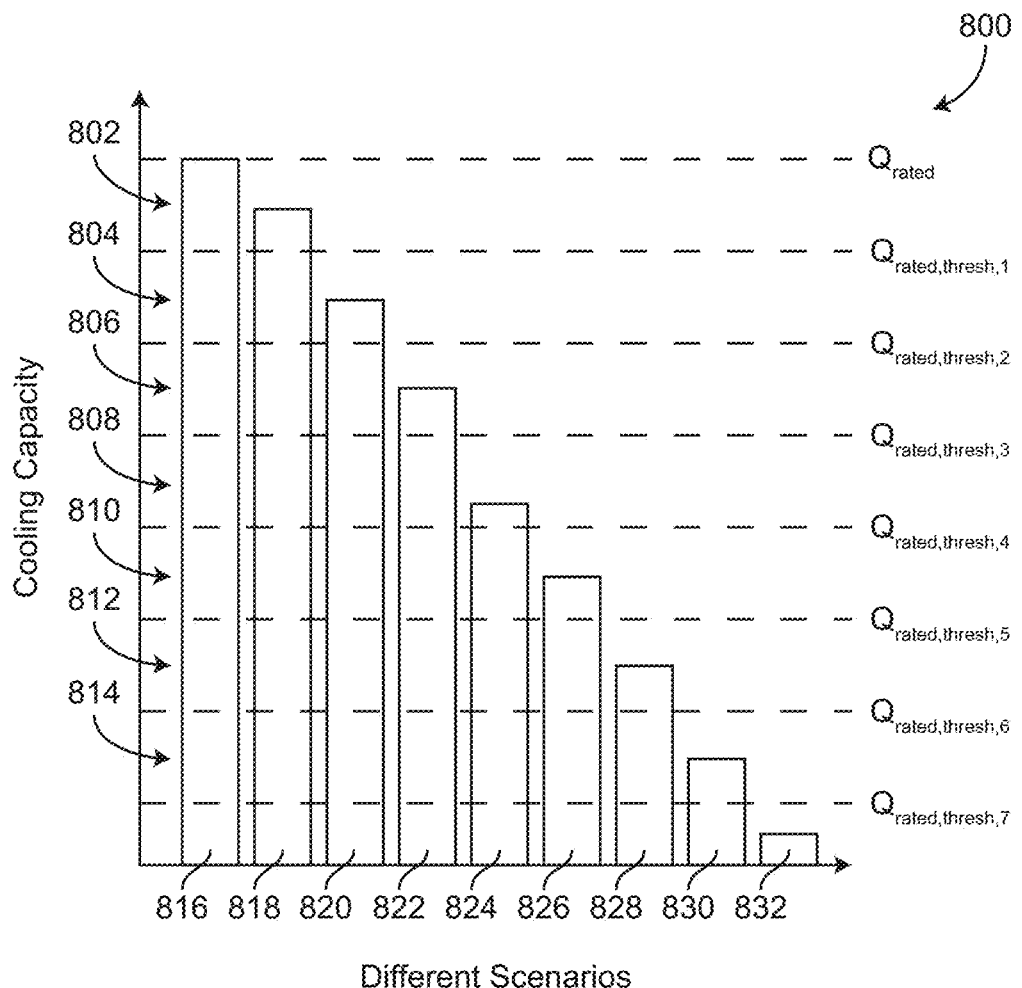
FIG. 8 is a graph showing different cooling capacity thresholds used to select a limp level for each of multiple display cases, and multiple scenarios, according to some embodiments.

Referring particularly to FIGS. 6 and 8, case priority manager 324 may be configured to compare the estimated cooling capacity $Q_{capacity}$ of rack 320 or display case 100 to a first range 802 (shown in graph 800 of FIG. 8):

$$Q_{rated} \leq Q_{capacity} \leq Q_{rated,thresh,1}$$

a second range 804:

$$Q_{rated,thresh,1} \leq Q_{capacity} \leq Q_{rated,thresh,2}$$

a third range 806:

$$Q_{rated,thresh,2} \leq Q_{capacity} \leq Q_{rated,thresh,3}$$

a fourth range 808:

$$Q_{rated,thresh,3} \leq Q_{capacity} \leq Q_{rated,thresh,4}$$

a fifth range 810:

$$Q_{rated,thresh,4} \leq Q_{capacity} \leq Q_{rated,thresh,5}$$

a sixth range 812:

$$Q_{rated,thresh,5} \leq Q_{capacity} \leq Q_{rated,thresh,6}$$

and a seventh range 814:

$$Q_{rated,thresh,6} \leq Q_{capacity} \leq Q_{rated,thresh,7}$$

where $Q_{rated,thresh,1}$, $Q_{rated,thresh,2}$, $Q_{rated,thresh,3}$, $Q_{rated,thresh,4}$, $Q_{rated,thresh,5}$, $Q_{rated,thresh,6}$, and $Q_{rated,thresh,7}$ are threshold amounts such that $Q_{rated} > Q_{rated,thresh,1} > Q_{rated,thresh,2} > Q_{rated,thresh,3} > Q_{rated,thresh,4} > Q_{rated,thresh,5} > Q_{rated,thresh,6} > Q_{rated,thresh,7}$. Each range corresponds to a different value of the limp level.

For example, if the estimated cooling capacity $Q_{capacity}$ is within the first range 802 (as illustrated by scenario 816 and scenario 818), case priority manager 324 may determine or assign a limp level of 0. Likewise, if the estimated cooling capacity $Q_{capacity}$ is within the second range 804 (as illustrated by scenario 820), case priority manager 324 may determine or assign a limp level of 1. If the estimated cooling capacity $Q_{capacity}$ is within the third range 806 (as illustrated by scenario 822), case priority manager 324 may determine or assign a limp level of 2. If the estimated cooling capacity $Q_{capacity}$ is within the fourth range 808 (as illustrated by scenario 824), case priority manager 324 may determine or assign a limp level of 3. If the estimated cooling capacity $Q_{capacity}$ is within the fifth range 810 (as illustrated by scenario 826), case priority manager 324 may determine or assign a limp level of 4. If the estimated cooling capacity $Q_{capacity}$ is within the sixth range 812 (as illustrated by scenario 828), case priority manager 324 may determine or assign a limp level of 5. If the estimated cooling capacity $Q_{capacity}$ is within the seventh range 814 (as illustrated by scenario 830), case priority manager 324 may determine or assign a limp level of 6. If the estimated cooling capacity $Q_{capacity}$ is less than the seventh threshold $Q_{rated,threshold,7}$, case priority manager 324 may determine or assign a limp level of 7 (as illustrated by scenario 832).

It should be understood that while FIG. 8 and the ranges shown and described herein correspond to seven limp levels, more or less ranges may be used so that case priority manager 324 can determine or assign more or less than seven limp levels. For example, case priority manager 324 may use thresholds or ranges corresponding to 5 limp levels, 6 limp levels, 8 limp levels, 10 limp levels, 16 limp levels, 100 limp levels, 255 limp levels, etc. In some embodiments, a number of limp levels is predetermined or predefined. In some embodiments, the number of limp levels is set by a user (e.g., through user device 328). In some embodiments, the number of limp levels is selected or determined by case priority manager 324 based on a type, model, or size of display case 100 or rack 320.

In some embodiments, the threshold values $Q_{rated,threshold,1}$, $Q_{rated,threshold,2}$, $Q_{rated,threshold,3}$, $Q_{rated,threshold,4}$, $Q_{rated,threshold,5}$, $Q_{rated,threshold,6}$, and $Q_{rated,threshold,7}$ are equally spaced apart. For example, in some embodiments, the condition: $(Q_{rated,threshold,1} - Q_{rated,threshold,2}) = (Q_{rated,threshold,2} - Q_{rated,threshold,3}) = (Q_{rated,threshold,3} - Q_{rated,threshold,4}) = (Q_{rated,threshold,4} - Q_{rated,threshold,5}) = (Q_{rated,threshold,5} - Q_{rated,threshold,6}) = (Q_{rated,threshold,6} - Q_{rated,threshold,7})$ is true. In other embodiments, the threshold values are not equally or evenly spaced apart. For example, a difference between subsequent threshold values (e.g., $Q_{rated,threshold,2}$ and $Q_{rated,threshold,3}$) may decrease or increase across the threshold values.

In general, for an n+1 number of limp levels (including a limp level of 0) or for an n number of limp levels (not counting the limp level of 0), case priority manager 324 may use the conditions:

$$Q_{rated} \leq Q_{capacity} \leq Q_{rated,thresh,1} \quad L=0$$

$$Q_{rated,thresh,1} \leq Q_{capacity} \leq Q_{rated,thresh,2} \quad L=1$$

$$Q_{rated,thresh,2} \leq Q_{capacity} \leq Q_{rated,thresh,3} \quad L=2$$

$$Q_{rated,thresh,3} \leq Q_{capacity} \leq Q_{rated,thresh,4} \quad L=3$$

$$\ldots$$

$$Q_{rated,thresh,n-1} \leq Q_{capacity} \leq Q_{rated,thres,n} \quad L=n$$

where L is the limp level.

Referring particularly to FIGS. 4 and 6, case priority manager 324 may be configured to generate an amount of cooling or a setpoint for each display case 100 or each rack 320 using the limp levels L (e.g., for each display case 100) and table 400. It should be understood that able 400 is shown for illustrative purposes only to represent different programmable features of each display case 100 for different limp levels L.

FIG. 4 shows table 400 including a column associated with each limp level 404, and corresponding cooling capacity percentages for different display cases 100 of a rack 320. For example, in the example represented by table 400, the display cases 100 includes a meat display case, a frozen meat display case, a deli case, a dairy case, a frozen food case, an ice cream case, a cut produce case, a produce case, and a beverage case, shown as cases 402. Each of cases 402 includes a corresponding percentage value (e.g., 0%, 70%, 100%, etc.) for each limp level 404. In some embodiments, the percentage values are predetermined or predefined. In some embodiments, the percentage values are programmable by a technician of rack 320. For example, the technician may provide the percentage values or normalized values (e.g., from 0 to 1) to central controller 304 through a human machine interface at each display case 100, or at each rack 320. In some embodiments, the technician may provide the percentage values or normalized values to central controller 304 through user device 328. The percentage values or the normalized values may indicate a degree to which each display case 100 should operate (e.g., a percentage of a maximum or rated cooling capability of each display case 100).

Table 400 generally includes three different types of percentage values. Specifically, table 400 includes deactivation values 406 (e.g., 0%), eco-mode or turndown values 408 (e.g., 70% values, or any other value between 0% and 100%), and fully activated values 410 (e.g., 100% values). In some embodiments, the deactivation values 406 indicate a limp level 404 at which the corresponding case 402 should be transitioned into an in-operational or deactivated mode (e.g., so that refrigeration apparatus 200 does not operate to provide cooling to inner volume 110), the turndown values 408 indicate a reduction in cooling for the display case 100 based on the limp level 404, and the fully activated values 410 indicate which cases 402 should be maintained at full cooling operation for different limp levels 404.

As shown in FIG. 4, when the limp level 404 is 0 (e.g., as determined by case priority manager 324), all of cases 402 are operated to provide full cooling (as indicated by fully activated values 410). When limp level 404 is 1 (as determined by case priority manager 324), the beverage case is deactivated (as indicated by deactivation value 406), and the produce case is turned down (as indicated by turndown value 408), while the rest of the cases 402 are maintained at full cooling (as indicated by fully activated values 410). When limp level 404 is 2, the produce case and the beverage case are deactivated (as indicated by deactivation value 406), the cut produce case is turned down (as indicated by turndown value 408), and the rest of the cases are maintained at full cooling (indicated by fully activated values 410). When limp level 404 is 3, the beverage case, the produce case, and the cut produce case are deactivated (as indicated by deactivation values 406), the ice cream case and the frozen food case are turned down (indicated by turndown values 408), and the rest of the cases are maintained at full cooling (indicated by fully activated values 410). When limp level 404 is 4, the ice cream case and the frozen food case are further deactivated (indicated by deactivation values 406), and the rest of the cases are maintained at full cooling (indicated by fully activated values 410). When limp level 404 is 5, the frozen meat case, the deli case, and the dairy case are turned down (as indicated by turndown values 408), and the meat case is maintained at full cooling (as indicated by fully activated values 410). When limp level 404 is 6, the dairy case and the deli case are further deactivated (as indicated by deactivation values 406), the frozen meat case is turned down (as indicated by turndown value 408), and the meat case is maintained at full cooling (as indicated by the fully activated value 410). When limp level 404 is 7, the meat case is maintained at full cooling (as indicated by the fully activated value 410) and the rest of the cases are deactivated (indicated by the deactivation values 406).

In some embodiments, the turndown values 408 are different for different types of cases 402 or for different types of products that are stored in cases 402. For example, the turndown value 408 for a produce case (shown in FIG. 4) may be 70% while the turndown value 408 for an ice cream case may be 60%. The turndown values 508 may transition the corresponding case 402 into an "eco" or economy mode when selected for use in operating the corresponding case 402. In some embodiments, the turndown values 508 are used to put a cap or a limit on a valve opening percentage, regardless of PID control demand for pulldown and/or maintenance.

In some embodiments, case priority manager 324 and/or control signal generator 326 are configured to use table 400 (or a similar table, or set of rules, or a corresponding set of instructions, etc.) to determine a cooling amount, a turndown amount, a cooling reduction, etc., for each display case 100 or rack 320. In some embodiments, case priority manager 324 and/or control signal generator 326 are configured to obtain values of table 400 (e.g., a percentage or a normalized value) for each display case for each limp level from a technician (e.g., through user device 328), shown as priority levels in FIGS. 3 and 6. Advantageously, the technician or owner may set the priority levels (e.g., the values of table 400) as programmable inputs so that display case management system 300 operates to continue to provide maximum cooling to certain cases, while reducing cooling to other cases to efficiently use the available cooling capacity $Q_{capacity}$ as preferred by the owner or technician. For example, the priority levels (or values of table 400) for a kth display case 100 and an nth limp level may be referred to as $A_{k,n}$. In some embodiments, the priority levels A are used by case priority manager 324 and/or control signal generator 326 to determine a cooling load $Q_{cool}$ or a temperature setpoint $T_{sp}$ for each display case 100.

For example, case priority manager 324 uses the corresponding priority level $A_{k,n}$ (as selected based on table 400), and a desired or rated cooling for a kth display case 100, $Q_{desired,k}$ to determine a cooling amount $Q_{cool,k,n}$ for the kth display case 100 for an nth limp level using the Equation:

$$Q_{cool,k} = A_{k,n} * Q_{desired,k}$$

according to some embodiments. For example, if the priority level $A_{k,n}$ is 70% (e.g., $A_{k,n}=0.7$), case priority manager 324 may determine that the kth display case 100 should be operated to achieve 70% of the desired or ideal cooling amount $Q_{cool,k}$. Likewise, if the priority level $A_{k,n}$ is 100% (e.g., $A_{k,n}=1.0$), case priority manager 324 may determine that the kth display case 100 should be operated to achieve 100% of the desired or rated cooling $Q_{desired,k}$. The desired or rated cooling for the kth display case 100, $Q_{desired,k}$ may indicate an amount of cooling that is provided to inner volume 110 of the kth display case 100 when rack 320 is operating properly, or when environmental/ambient conditions/temperatures are within expected or normal ranges. In some embodiments, the desired or rated cooling $Q_{desired,k}$ is a predetermined or a predefined value. In some embodiments, the desired or rated cooling $Q_{desired,k}$ is a programmable value that can be set by a user, technician, owner, etc., (e.g., provided through user device 328) based on a type of product that is stored within the kth display case 100.

In some embodiments, case priority manager 324 is configured to use the corresponding priority level $A_{k,n}$ and a desired or rated temperature setpoint for the kth display case 100, $T_{sp,desired,k}$ to determine a temperature setpoint $T_{sp,k}$ for the kth display case 100 for an nth limp level. Case priority manager 324 uses the Equation:

$$T_{sp,k} = T_{amb} - A_{k,n} * (T_{amb} - T_{sp,desired,k})$$

according to some embodiments. For example, if the priority level $A_{k,n}$ of the kth display case 100 for the nth limp level is 70% (e.g., $A_{k,n}=0.7$), case priority manager 324 may determine that the kth display case 100 should be operated to achieve 70% cooling (based on temperatures).

For example, assuming that the ambient temperature $T_{amb}$ (as obtained by ambient sensor 312) is 70 degrees Fahrenheit (i.e., $T_{amb}=70°$ F.), the desired or rated setpoint $T_{sp,desired,k}$ for the kth display case 100 is 30 degrees Fahrenheit (i.e., $T_{sp,desired,k}=30°$ F.), and the priority level $A_{k,n}$ is 70% (i.e., $A_{k,n}=0.7$), case priority manager 324 determines the temperature setpoint $T_{sp,k}$ as:

$$T_{sp,k}=70° \text{ F.}-0.7(70° \text{ F.}-30° \text{ F.})=42° \text{ F.}$$

according to some embodiments.

In some embodiments, case priority manager 324 is configured to provide the temperature setpoint $T_{sp,k}$ or the cooling amount $Q_{cool,k}$ for the kth display case 100 to control signal generator 326. Control signal generator 326 can use the temperature setpoint $T_{sp,k}$ and/or the cooling amount $Q_{cool,k}$ to generate control signals for refrigeration apparatus 200, rack 320, or display case 100. In some embodiments, control signal generator 326 provides the temperature setpoint $T_{sp,k}$ to refrigeration apparatus 200 and refrigeration apparatus 200 uses the temperature setpoint $T_{sp,k}$ to achieve the temperature setpoint $T_{sp,k}$ within inner volume 110.

In some embodiments, case priority manager 324 is configured to store and use Table 1, shown below, to determine a priority level $A_{k,n}$ for a kth display case 100 given a particular limp level L. Table 1 includes a first column including k number of display cases 100. Table 1 also includes columns for each value of the limp level L (e.g., for L=1 to L=n). Case priority manager 324 may store Table 1 in one or more different forms (e.g., tabular form, as shown, matrix form, etc.).

TABLE 1

Limp Levels and Case Priorities

| Case: | L = 0 | L = 1 | L = 2 | L = 3 | L = 4 | ... | L = n |
|---|---|---|---|---|---|---|---|
| Case 1 | $A_{1,0}$ | $A_{1,1}$ | $A_{1,2}$ | $A_{1,3}$ | $A_{1,4}$ | ... | $A_{1,n}$ |
| Case 2 | $A_{2,0}$ | $A_{2,1}$ | $A_{2,2}$ | $A_{2,3}$ | $A_{2,4}$ | ... | $A_{2,n}$ |
| Case 3 | $A_{3,0}$ | $A_{3,1}$ | $A_{3,2}$ | $A_{3,3}$ | $A_{3,4}$ | ... | $A_{3,n}$ |
| ... | ... | ... | ... | ... | ... | ... | ... |
| Case k | $A_{k,0}$ | $A_{k,1}$ | $A_{k,2}$ | $A_{k,3}$ | $A_{k,4}$ | ... | $A_{k,n}$ |

In some embodiments, case priority manager 324 is configured to determine the temperature setpoint $T_{sp,k}$ and/or the cooling amount $Q_{cool,k}$ for each display case 100 (e.g., for a kth display case 100) without requiring characterization, estimation, calculation, determination, etc., of the cooling capacity $Q_{capacity}$ of rack 320 or display cases 100. In some embodiments, case priority manager 324 still uses Table 1 as shown above (or table 400 shown in FIG. 4) to determine the priority level $A_{k,n}$ for the kth display case 100. However, case priority manager 324 can be configured to select the limp level L (e.g., a limp mode) based on dynamic feedback. Case priority manager 324 can step up or step down the limp level L one level (or multiple levels) at a time and monitor feedback from rack 320 or any of the display cases 100 (e.g., the input data) until the input data indicates that rack 320 or display case 100 can sustain the cooling load. In some embodiments, case priority manager 324 is configured to step up or increase the limp level L if a store load decreases/reduces or if a capacity of rack 320 increases due to ambient conditions (e.g., based on the ambient temperature $T_{amb}$ as measured by ambient sensor 312 and/or the relative humidity RH as measured by relative humidity sensor 330) or dynamic loading of various components in the building (e.g., dynamic loading of various components of rack 320).

In some embodiments, central controller 304 is configured to operate one or more racks 320 or display cases 100 in an eco-optimizing or economical defrost mode. For example, if rack 320 is operating at maximum capacity (e.g., all display cases 100 operate to provide a rated or a maximum amount of cooling), central controller 304 may coordinate defrost termination so that rack 320 operates at a maximum of 10% or 5% of a load for the building with high demand due to pulldown. Central controller 304 may initiate defrost operations (e.g., activating one or more light emitting devices, heating elements, etc.) of a proximate zone when terminating defrost operations of a previous zone to "load balance" on a time-scale. In some embodiments, central controller 304 is also configured to operate all cases 100 or racks 320 in the building with a maximum time between defrost operations to reduce energy consumption.

Process

Figure 7:
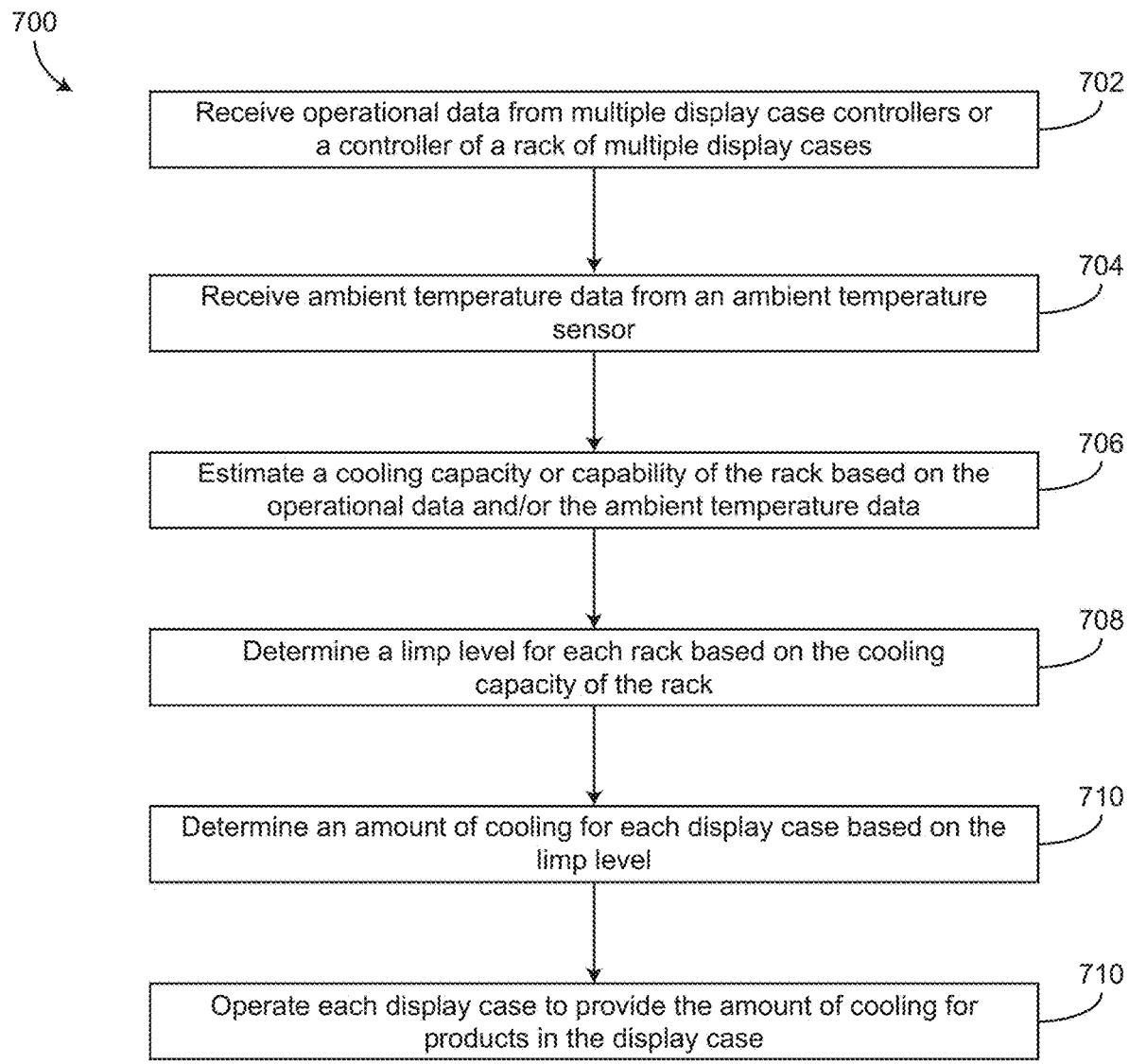
FIG. 7 is a flow diagram of a process for performing a turndown operation for one or more display cases, according to some embodiments.

Referring to FIG. 7, a process 700 for turning down operation of one or more refrigerated display cases is shown. Process 700 includes steps 702-710 and may be performed by display case management system 300. Process 700 can be performed to turndown or reduce a cooling amount, a cooling rate, or a temperature setpoint of one or more of the refrigerated display cases. For example, process 700 can be performed to actively or dynamically shut down one or more display cases, while maintaining other display cases at a cold temperature to reduce a likelihood that particular products will spoil or become warm. Process 700 can also include operating one or more display cases to provide a reduced amount of cooling.

Process 700 includes receiving operational data from multiple display case controllers or a controller of a rack of multiple display cases (step 702), according to some embodiments. In some embodiments, step 702 is performed by central controller 304. For example, central controller 304 can obtain operational data, sensor data, etc., (shown as input data in FIG. 3) from controllers 302 (e.g., local controllers) to perform step 702.

Process 700 includes receiving ambient temperature data from an ambient temperature sensor (step 704), according to some embodiments. In some embodiments, step 704 is performed by ambient sensor 312 and central controller 304. The ambient temperature data may indicate a current value of temperature in an area, zone, building, etc., where the display cases or racks are located. In some embodiments, step 704 includes receiving relative humidity data from a relative humidity sensor. The relative humidity data can be used in place of or in addition to the ambient temperature data.

Process 700 includes estimating a cooling capacity or capability of the rack based on the operational data, the relative humidity data, and/or the ambient temperature data (step 706), according to some embodiments. In some embodiments, step 706 is performed by rack capacity manager 322. Rack capacity manager 322 can use the operational data, the relative humidity data, and/or the ambient temperature data to determine an amount of cooling that rack 320 or display cases 100 can provide, based on the operational ability of the rack 320 and/or display cases 100, and current environmental or ambient conditions. Step 706 can include identifying one or more failed components of the rack based on the operational data. In some embodiments, step 706 includes estimating or calculating a decrease of a rated cooling capacity of the rack or display cases that results from the operational ability of the rack, and a decrease in the rated cooling capacity of the rack or the display cases that results from the ambient temperature data (e.g., current environmental conditions) and/or the relative humidity data.

Process 700 includes determining a limp level for each rack based on the cooling capacity of the rack (step 708), according to some embodiments. In some embodiments, the limp level is a quantity that can be used to determine a reduced cooling or whether certain racks or display cases should be shut off. In some embodiments, multiple limp levels are selected, assigned, determined, etc., for different display cases. For example, a first display case may be assigned a first limp level, while a second display case is assigned a second or different limp level. In some embodiments, the limp level is uniform or the same across different display cases so that all the display cases are assigned the same limp level. Step 708 can be performed by case priority manager 324. In some embodiments, case priority manager 324 selects or determines the limp level based on a predetermined or predefined set of instructions (e.g., a schedule). For example, step 708 can include selecting a first limp level, monitoring feedback data obtained from the controllers at the racks or the display cases, and determining if the racks are able or sufficient to provide cooling given the first limp level. Step 708 can include intermittently increasing or decreasing the limp level based on whether or not the racks are able to sufficiently provide cooling.

Process 700 includes determining an amount of cooling for each display case based on the limp level (step 710), according to some embodiments. In some embodiments, step 710 is performed by case priority manager 324. Step 710 can include using table 400 (shown in FIG. 4) or Table 1, shown above, to determine the amount of cooling for each display case based on the limp level. Step 710 can include determining, selecting, obtaining, calculating, estimating, etc., a priority level A for each display case 100. The priority level may indicate a percentage of a total or maximum or rated amount of cooling that should be provided to each display case 100. Step 710 includes using the priority level and a known rated or maximum cooling capability of each display case 100 to determine a cooling amount for each display case 100, or a temperature setpoint for each display case 100. The priority levels for the different display cases 100 may be preset values or may be programmable values that can be set by a technician, owner, or user of display case management system 300.

Process 700 includes operating each display case to provide the amount of cooling for products in the display case (step 712), according to some embodiments. Step 712 can be performed by control signal generator 426. Control signal generator 426 may use the temperature setpoints or amount of cooling for each display case as determined in step 712 to generate control signals for any of display cases 100 or racks 320.

Configuration of Exemplary Embodiments

The construction and arrangement of the temperature-controlled display device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "first", "second", "primary," "secondary," "above," "below," "between," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the FIGURES may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A display case management system for a plurality of display cases, the display case management system comprising:
   a rack configured to serve the plurality of display cases;
   a plurality of local controllers positioned at the plurality of display cases;
   a controller comprising processing circuitry configured to perform operations comprising:
      receiving operational data from the plurality of local controllers, the operational data comprising an operational status of components of one or more of the plurality of display cases;
      receiving an ambient temperature reading from an ambient temperature sensor proximal the plurality of display cases;
   determining a limp level based on the operational data received from the plurality of display cases, the limp level defining a cooling status of each of the plurality of display cases, the limp level based on: i) an operational capability of each of the plurality of display cases to achieve a desired cooling, and ii) an assigned priority level for each of the plurality of display cases, the assigned priority level comprising a degree of criticality of the respective display case;
   identifying, based on the limp level and the ambient temperature, a first set of the plurality of display cases to be operated in a reduced cooling mode, a second set of the plurality of display cases to be operated in a maximum cooling mode, and a third set of the plurality of display cases to be adjusted to a shut off mode; and
   operating, based on the limp level and the ambient temperature, the first set of display cases in the reduced cooling mode, the second set of display cases in the maximum cooling mode, and the third set of display cases in the shut off mode.

2. The display case management system of claim 1, wherein the assigned priority levels are programmable values that indicate the degree of criticality of each of the plurality of display cases.

3. The display case management system of claim 2, wherein the assigned priority levels are provided by a user to the controller through a user device.

4. The display case management system of claim 1, wherein the processing circuitry is further configured to perform operations comprising:
   estimating a cooling capability of the rack using the operational data and the ambient temperature;
   comparing the estimated cooling capability of the rack to a rated cooling capability of the rack; and
   determining the limp level based on the comparison between the cooling capability of the rack and the estimated cooling capability of the rack.

5. The display case management system of claim 1, wherein the assigned priority levels comprise one or more of:
   a fully activated level, wherein display cases with the fully activated level receive a rated amount of cooling;
   a turned down level, wherein display cases with the turned down level receive a reduced amount of cooling; and
   a deactivated level, wherein display cases with the deactivated level are shut off.

6. The display case management system of claim 1, wherein the processing circuitry is further configured to perform operations comprising determining the limp level from a plurality of limp levels, wherein each of the plurality of limp levels comprises a corresponding priority level for each of the plurality of display cases.

7. The display case management system of claim 1, wherein operating, based on the limp level and the ambient temperature, the plurality of display cases to provide reduced cooling comprises one or more of increasing an amount of time between defrost operations or sequencing defrost operations for load balancing.

8. A method for managing a plurality of refrigerated display cases, the method comprising:
   receiving operational data comprising an operational status of components of the plurality of refrigerated display cases;
   receiving an ambient temperature reading from an ambient temperature sensor proximal the plurality of refrigerated display cases;
   determining a limp level based on the operational data received from the plurality of refrigerated display cases, the limp level defining a cooling status of each of the plurality of refrigerated display cases, the limp level based on: i) an operational capability of each of plurality of refrigerated display cases to achieve a desired cooling and ii) an assigned priority level for each of the plurality of refrigerated display cases, the assigned priority level comprising a degree of criticality of the respective refrigerated display case;
   identifying, based on the limp level and the ambient temperature, one or more of the plurality of refrigerated display cases to be operated to provide reduced cooling, one or more of the plurality of refrigerated display cases to be operated to maintain maximum cooling, and one or more of the plurality of refrigerated display cases to be shut off; and
   operating, based on the limp level and the ambient temperature, the plurality of refrigerated display cases to provide reduced cooling, the one or more of the plurality of refrigerated display cases to maintain maximum cooling, and shut off the one or more of the plurality of refrigerated display cases that should be shut off.

9. The method of claim 8, further comprising:
automatically increasing or decreasing the limp level;
operating each of the plurality of refrigerated display cases according to the assigned priority level for the increased or decreased limp level;
monitoring the operational data from the plurality of refrigerated display cases;
determining if a rack that serves the plurality of refrigerated display cases can provide sufficient cooling for the plurality of refrigerated display cases based on the operational data; and
automatically increasing or decreasing the limp level based on the determination of whether the rack can provide sufficient cooling for the plurality of refrigerated display cases.

10. The method of claim 8, wherein the assigned priority level comprising the degree of criticality of the respective refrigerated display case are programmable values.

11. The method of claim 10, wherein the assigned priority levels are provided by a user through a user device.

12. The method of claim 8, further comprising:
estimating a cooling capability of a rack that serves the plurality of refrigerated display cases using the operational data and the ambient temperature;
comparing the estimated cooling capability of the rack to a rated cooling capability of the rack; and
determining the limp level based on the comparison between the cooling capability of the rack and the estimated cooling capability of the rack.

13. The method of claim 8, wherein the assigned priority levels comprise one or more of:
a fully activated level, wherein refrigerated display cases with the fully activated level receive a rated amount of cooling;
a turned down level, wherein refrigerated display cases with the turned down level receive a reduced amount of cooling; or
a deactivated level, wherein refrigerated display cases with the deactivated level are shut off.

14. A controller for a refrigerated display case, the controller comprising processing circuitry configured to perform operations comprising:
receiving operational data comprising an operational status of components of a plurality of refrigerated display cases and an ambient temperature reading from an ambient temperature sensor proximal the plurality of refrigerated display cases;
determining a limp level based on the operational data received from the plurality of refrigerated display cases, the limp level defining a cooling status of each of the plurality of refrigerated display cases, the limp level based on: i) an operational capability of each of plurality of refrigerated display cases to achieve a desired cooling and ii) an assigned priority level for each of the plurality of refrigerated display cases, the assigned priority level comprising a degree of criticality of the respective refrigerated display case;
identifying, based on the limp level and the ambient temperature, an operational cooling parameter for each of the plurality of refrigerated display cases, wherein the operational cooling parameter indicates an amount of cooling or a corresponding cooling operation for each refrigerated display case; and
operating each of the plurality of the refrigerated display cases using the operational cooling parameter.

15. The controller of claim 14, wherein the operational cooling parameter is any of a cooling amount for each of the plurality of refrigerated display cases or a temperature setpoint for each of the plurality of refrigerated display cases.

16. The controller of claim 14, wherein the processing circuitry is further configured to perform operations comprising:
using the limp level and a plurality of priority levels associated with the limp level to determine the operational cooling parameter.

17. The controller of claim 16, wherein the plurality of priority levels are programmable values that indicate a degree of criticality of each of the plurality of refrigerated display cases.

18. The controller of claim 17, wherein the plurality of priority levels are provided for each of a plurality of different limp levels by a user to the controller through a user device.

19. The controller of claim 16, wherein the plurality of priority levels comprise one or more of:
a fully activated level, wherein refrigerated display cases with the fully activated level are operated to provide a rated amount of cooling to an inner volume;
a turned down level, wherein refrigerated display cases with the turned down level are operated to provide a reduced amount of cooling; and
a deactivated level, wherein refrigerated display cases with the deactivated level are shut off.

20. The controller of claim 16, wherein the processing circuitry is further configured to perform operations comprising determining the limp level from a plurality of limp levels, wherein each of the plurality of limp levels comprises a corresponding priority level for each of the plurality of refrigerated display cases.

* * * * *